United States Patent [19]
Kirkland

[11] Patent Number: 5,986,669
[45] Date of Patent: Nov. 16, 1999

[54] GRAPHICS PROCESSING WITH EFFICIENT CLIPPING

[75] Inventor: Dale Kirkland, Madison, Ala.

[73] Assignee: Intergraph Corporation, Huntsville, Ala.

[21] Appl. No.: 08/926,120

[22] Filed: Sep. 9, 1997

Related U.S. Application Data

[60] Provisional application No. 60/026,292, Sep. 10, 1996.
[51] Int. Cl.⁶ ..................................................... G06F 15/00
[52] U.S. Cl. ............................................................ 345/434
[58] Field of Search ...................................... 345/434, 433, 345/118, 121, 117

[56] References Cited

U.S. PATENT DOCUMENTS 4,845,651 7/1989 Aizawa et al. ........................... 364/522
5,675,720 10/1997 Sato et al. ................................. 395/119

*Primary Examiner*—Phu K. Nguyen
*Attorney, Agent, or Firm*—Bromberg & Sunstein LLP

[57] ABSTRACT

A method for determining data characterizing a primitive resulting after the primitive has been subjected to clipping determines the data after the primitive has been clipped. The data, which may be attribute data, is not determined prior to clipping, thereby saving processing time if the primitive is clipped entirely from view (i.e., a viewing plane displayed on a display device). The primitive initially is defined by a set of initial vertices and a set of attributes associated with the initial vertices. After each instance of clipping, the primitive becomes a resulting primitive defined by a modified set of vertices that may include a new vertex and a modified set of attributes associated with the modified set of vertices.

48 Claims, 3 Drawing Sheets

GRAPHICS PROCESSING WITH EFFICIENT CLIPPING

PRIORITY

This application claims priority from provisional application serial No. 60/026,292, filed Sep. 10, 1996, entitled "GRAPHICS PROCESSING WITH EFFICIENT CLIPPING" and bearing attorney docket number 1247/136, which is incorporated herein, in its entirety, by reference.

FIELD OF THE INVENTION

This invention relates generally to computation devices for graphics rendering systems and, more particularly, this invention relates to such systems utilizing graphical n-vertex primitives for constructing more complex shapes having attributes, where the primitive shapes are subjected to clipping and culling procedures before they are displayed upon a display device.

BACKGROUND

There are many prior art techniques for using computers to display (i.e., render) realistic graphical images. In an effort to standardize such techniques, graphics application programming interfaces (APIs) have been created both to (1) define how rendering is to be performed internal to a computer graphics program, and (2) to offer a consistent programming interface for constructing efficient computer graphics rendering programs. A fundamental component of such APIs is that a graphics program must be able to clip images (defined below) to be displayed upon a display device. The images that are displayed often are formed by combining tens of thousands of "primitives" that themselves often are clipped.

Selected terms used in the specification and the accompanying claims are defined as follows:

A primitive is an m-sided polygon having both an inside surface and an outside surface. Attributes (discussed below) are rendered on the outside surface and not on the inside surface.

A frustrum is an n-dimensionally defined viewing area.

Clipping is the process of truncating a line segment that forms part of the perimeter of a primitive shape to the intersection of the line segment with a view area, where the view area is a region defined by view planes, clipping planes, or frustrums, and where only the portion of the primitive within the view area is to be displayed.

Culling is a process for verifying whether the outside surface of a primitive faces away from the viewing and, if so, not rendering that primitive.

A primitive is defined by a collection of vertex points. The vertex points represent the ends of line-segments forming the shape of the primitive. There are at least two types of primitives. The first type is defined by the set of vertices defining the primitive before clipping or culling has been performed. The second is defined by vertices that are generated after the first type of primitive has been clipped and culled. Associated with each initial vertex is data including the spatial-coordinates for the vertex, as well as other information regarding attributes of the primitive at that vertex. Attributes may include color, lighting, texture, shading, fog, reflection, opacity, or other known attributes desired to be tracked and rendered by the graphics program. When the first type of primitive is clipped, a resulting primitive (second type of primitive) is formed having an edge corresponding to the intersection of the first primitive with the view area. The portions of the first primitive that extend over the edge and outside of the view area are discarded. New vertices are formed at the intersections of the primitive component line-segments and the view area.

In the prior art, the attribute values at the initial vertices for the primitive are calculated before clipping or culling. Graphics APIs such as, for example, OpenGL (originally created by Silicon Graphics Systems, Inc.) Often are utilized in calculating attribute values. For more information regarding the OpenGL API standard, "The OpenGL Technical Library" (ISBN 0-201-63276-4; ISBN 0-201-63274-8), published by Addison-Wesley, is incorporated herein by reference. The "OpenGL Reference Manual: The Official Reference Document for OpenGL, Release 1", by the OpenGL Architecture Review Board, published by Addison-Wesley (1992), also is incorporated herein by reference.

FIG. 1 is a flow chart showing an exemplary process used by typical prior art applications for rendering a primitive. The process begins at step 1 in which the graphics rendering system receives the initial vertices corresponding to a primitive to be displayed. At step 2, the vertices are transformed, if necessary, into the coordinate system of the rendering system. At step 3, a check is made to determine whether the primitive may be trivially rejected before proceeding with clipping. If so, processing stops at step 4. If the primitive cannot be trivially rejected, the process continues to steps 5, 6. 7, and 8, in which lighting, texturing, fog, or other attribute values are calculated for the initial vertices of the primitive. At step 9, a test is made to determine whether the primitive must be clipped against the viewing area or other area defined by the user of the rendering system. If clipping is not necessary, then the process skips to step 13 (discussed below). If clipping is necessary, then the primitive is clipped and new vertices are formed corresponding to the edges of the clipped region (step 10)). At step 11, it then is determined whether any portion of the primitive remains in the viewing area after clipping. If no portion remains, then the primitive is rejected at step 12, thus terminating processing. If some portion of the primitive remains, then the process continues to step 13 in which the face direction of the primitive is calculated. Based on the face direction, it then is determined at step 14 whether culling is appropriate. If culling is appropriate, the process terminates (step 15). If culling is not appropriate, then the resulting primitive (i.e., second type of primitive) is displayed (step 16).

One problem with the prior art method shown in FIG. 1 is that many unnecessary calculations for ascertaining attribute values at the initial vertices are performed for primitives that are ultimately culled or completely clipped out of view. Specifically, it is not necessary to calculate the attribute values (which may be computationally intensive) if a primitive is not to be displayed. Doing such calculations therefore is inefficient since it utilizes valuable processor time for making these detailed and unnecessary computations.

SUMMARY OF THE INVENTION

In accordance with one embodiment of the invention, a method for determining data characterizing a primitive resulting after the primitive has been subjected to clipping determines the data after the primitive has been clipped. The data, which in this embodiment may be attribute data, is not determined prior to clipping, thereby saving processing time if the primitive is clipped entirely from view (i.e., a viewing plane displayed by a display device). The primitive initially is defined by a set of initial vertices and a set of attributes associated with the initial vertices. After each instance of clipping, the primitive becomes a resulting primitive defined by a modified set of vertices that may include a new vertex and a modified set of attributes associated with the modified set of vertices.

This embodiment of the method comprises several steps, including identifying the location of each new vertex that has been created by an instance of clipping, and determining a set of coefficients for each new vertex. Each coefficient of the set reflects the contribution of attribute values by a vertex of the primitive prior to the instance of clipping. Such contributions may be expressed as a fraction representing the percent contribution by the each vertex. The method excludes from the resulting primitive any vertex that is deemed out (i.e., not visible in the viewing plane) as a result of clipping. The steps of identifying, determining, and excluding are repeated for each instance of clipping. Once clipping is completed, it is determined whether the primitive remains for viewing. If the primitive has been determined to remain after clipping, the values of the attributes for each of the initial vertices is calculated. Once the attributes of the initial vertices are calculated, the values of the attributes at each new vertex remaining after clipping are calculated. These calculated attributes of the new vertices are calculated by using the set of coefficients associated therewith.

In accordance with another embodiment of the invention, the primitive is subjected to culling and clipping. Accordingly, the attributes of the new vertices are not calculated until it is determined that the primitive remains after both the clipping and culling operations.

In accordance with additional embodiments, the invention may be implemented as an apparatus, or as a computer program product for use on a computer system.

BRIEF DESCRIPTION OF THE DRAWINGS

The foregoing and other objects and advantages of the invention will be appreciated more fully from the following further description thereof with reference to the accompanying drawings wherein.

DESCRIPTION OF ILLUSTRATIVE EMBODIMENTS

Figure 1:
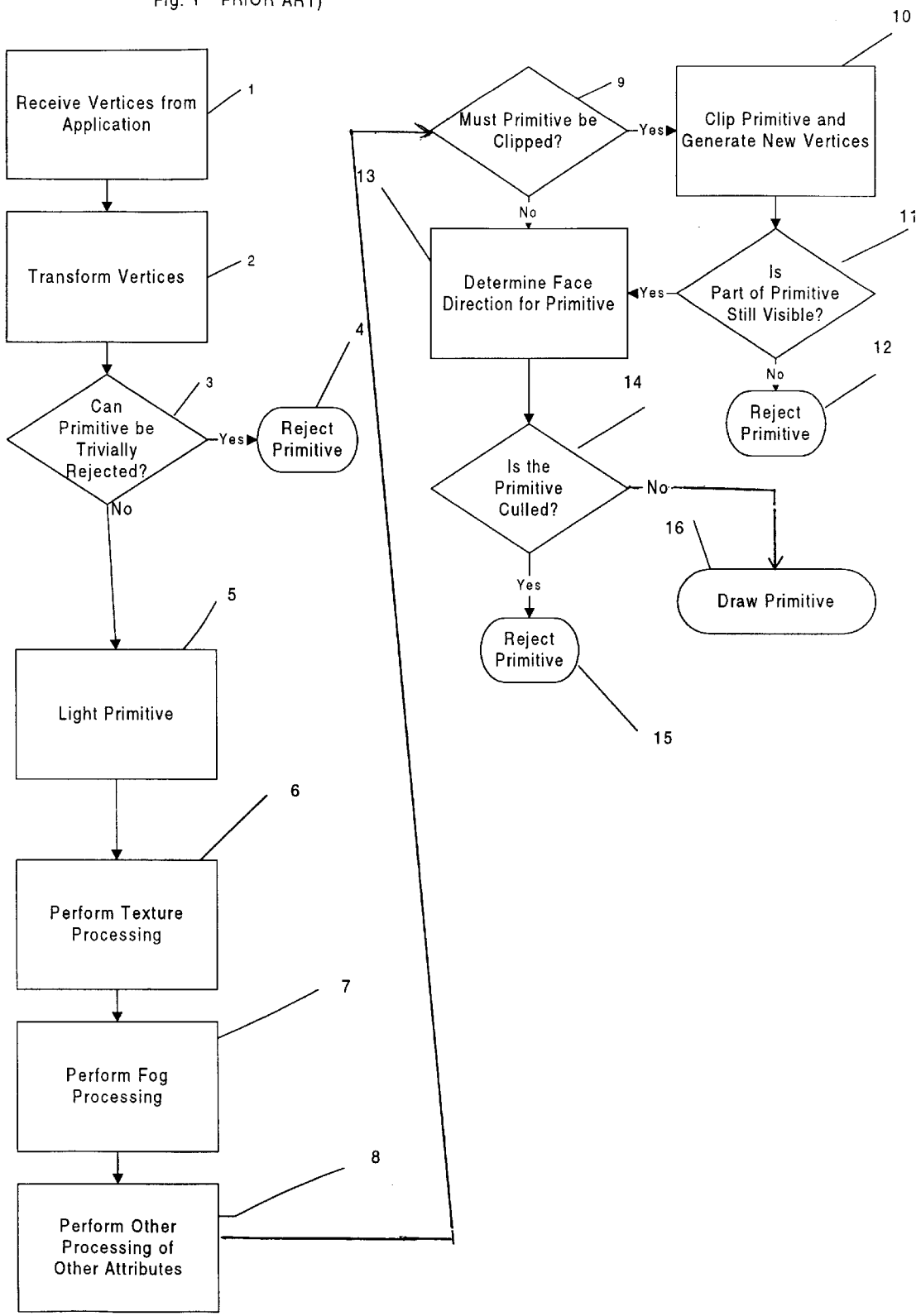
FIG. 1 is a flow chart showing a typical prior art approach to clipping primitives.

In a preferred embodiment, the invention comprises a rendering system for deferring attribute calculation until after a primitive has been clipped, processed for culling, and/or otherwise determined to be visible for rendering. In so doing, unnecessary calculations will be avoided if the resulting primitive is not to be displayed as a result of the clipping and/or culling.

In a preferred embodiment of the invention, attributes (e.g., color, lighting, texture, shading, fog, reflection, and opacity) assigned to a region on the primitive change linearly across the face of the primitive. Although the present invention may be extended to handle non-linear relationships among the attributes, preferred embodiments of the present invention are directed to processing linear attribute relationships because rendering such configurations is more efficient than rendering non-linear attribute relationships. Rendering operations may be used in conjunction with the OpenGL API.

In preferred embodiments of the invention, attribute calculations are deferred by first enabling, the rendering system to receive the coordinates of the initial vertices defining the initial primitive that may be displayed. These coordinates are stored within computer memory associated with the vertices. A set of coefficients representing the percentage of contribution of any attribute by each of the initial vertices then is stored in memory for each initial vertex. More particularly, in preferred embodiments, any point within the primitive can be described as a function of the percentages of the original attribute data. As discussed below, these percentages may be expressed in terms of a fractional value between zero and one. In a preferred embodiment of the present invention, when a primitive is clipped and new vertices are created, additional sets of coefficients are stored in computer memory for each of the new vertices. This new coefficient data is used to calculate the attribute values at the new vertices with respect to the initial vertices when it is time to render the final form of the primitive (i.e., after clipping and culling).

In accordance with preferred embodiments, attribute data ($D_P$) for any point P on or in an n-sided polygon, whether it is the initial primitive or a later-derived polygon, satisfies equation 1 below:

$$D_P = C_0 D_0 + C_1 D_1 + C_2 D_2 + \ldots + C_n D_n \quad \text{Eq. 1}$$

where $C_n$ is the coefficient data stored within computer memory representing the percent attribute contribution of vertex n for a point P, and $D_n$ is the attribute value of vertex n. As noted above, the coefficients are utilized in a preferred embodiment of the invention to indicate the percentage influence of each of a plurality of vertices on a new vertex, which may be at point P. When point P is a new vertex, then $D_P$ is the resulting attribute value of that new vertex calculated as the sum of percentage influence from the other vertices.

There are n-coefficients for each point in an n-sided polygon (i.e., one coefficient for each vertex). Thus, three coefficients per point are required for a triangle primitive, four coefficients per point are required for a quadrilateral, and so on. To generate initial coefficients for a triangle primitive, for example, a triplet of coefficient values is assigned to each initial vertex of the triangle as follows:

| Vertex | $C_A$ | $C_B$ | $C_C$ |
| --- | --- | --- | --- |
| A | 1.0 | 0.0 | 0.0 |
| B | 0.0 | 1.0 | 0.0 |
| C | 0.0 | 0.0 | 1.0 |

The table shows that the initial vertices each have a 100% influence upon themselves. The term "interpolation", as used in the description and claims that follow, is defined as a method of determining coefficient values for calculating attribute values in accordance with Eq. 1 and as further described below.

Figure 2:
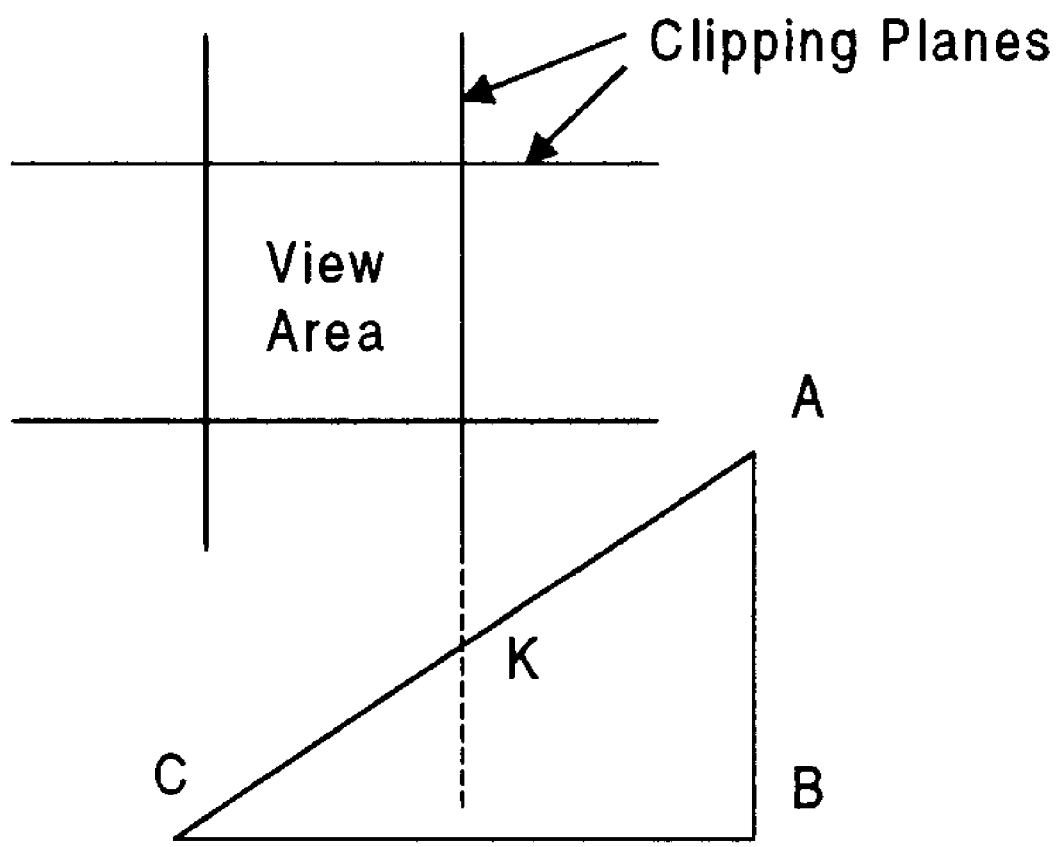
FIG. 2 shows a triangle primitive that is to be clipped against a rectangular clipping area.

FIG. 2 shows a triangle primitive, defined by vertices A, B, and C, which is being clipped against a rectangular view area. As previously noted, in preferred embodiments of the present invention, attribute information for any point in the primitive is not calculated prior to clipping or culling. Instead, sets of coefficients are computed via interpolation for each new vertex. As noted with respect to attributes, coefficients on a primitive change linearly across the face of the polygon. For example, assume that in FIG. 2 the first clip operation clips the primitive with respect to the right side of the view area. In addition, assume line segment AC consequently is clipped exactly at its mid-point. The new vertex ("K") created as a result of the clipping of segment AC would have the set if coefficients $C_A=0.5$, $C_B=0.0$, $C_C=0.5$. In preferred embodiments, new vertices on a line segment between two initial vertices have a coefficient contribution from the two vertices defining the line segment only.

Accordingly, utilizing Eq. 1 for calculating the red attribute value for new vertex K on the primitive shown in FIG. 2 is simply a matter of computing $(C_A*Red_A)+(C_B*Red_B)+C_C*Red_C)$, which equals $(0.5*Red_A)+(0.0*Red_C)+(0.5*Red_C)$. Although the attribute may be calculated at any given time, preferred embodiments store the coefficients for later retrieval and rendering only if the primitives have been determined to be visible after clipping and culling. Consequently, as further new vertices are created, the coefficients for vertex K may be used to generate the coefficients for such further new vertices. Parametric clipping of the clipped line segment may be used to determine the coefficient values.

Figure 3:
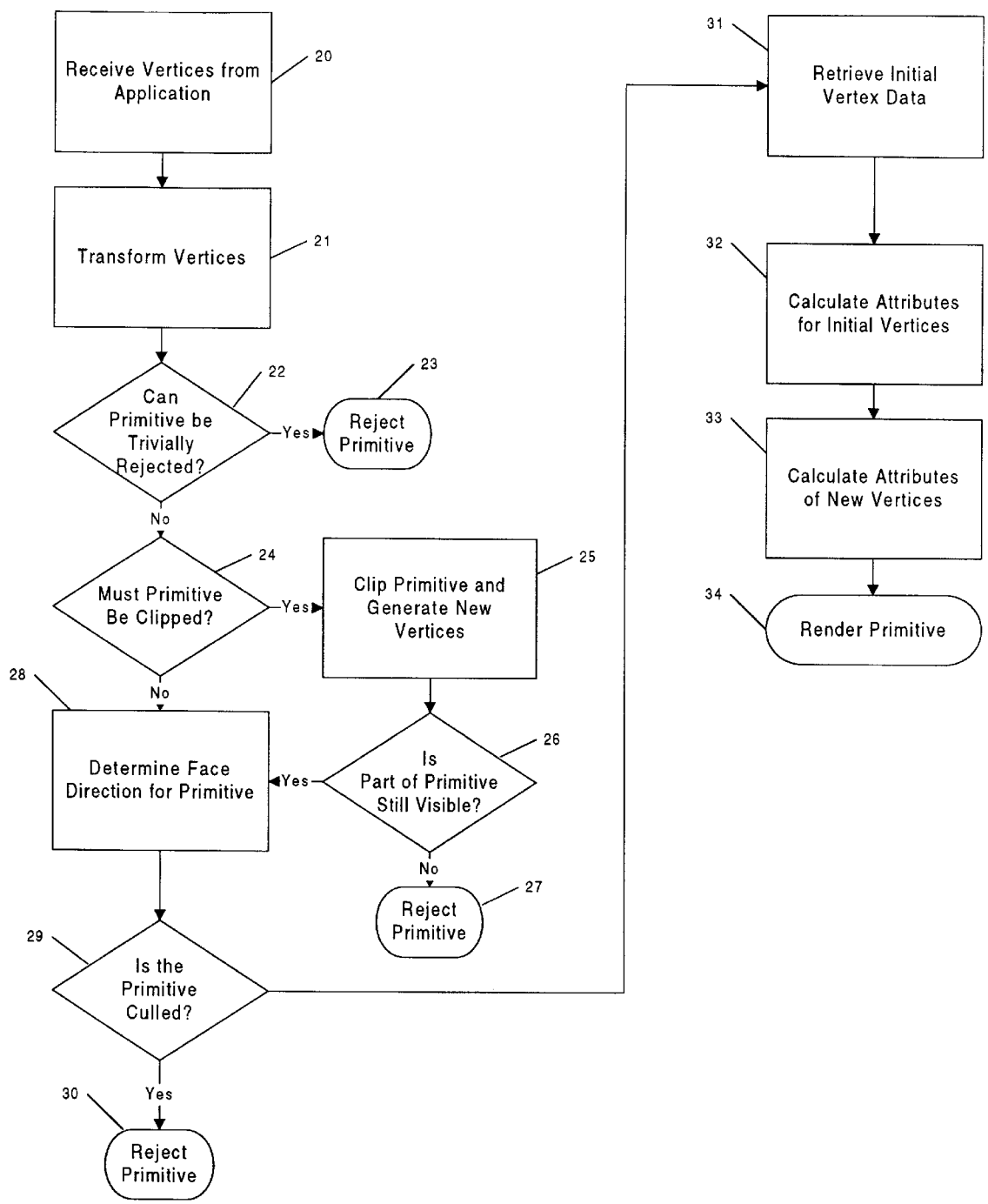
FIG. 3 is a flow chart showing a preferred embodiment for clipping primitives.

FIG. 3 is a flow chart of a preferred method of clipping primitives. At step 20, a rendering engine (i.e., rendering system) receives the vertices corresponding to a graphics primitive to be manipulated. In addition, data used to calculate attributes also may be received but not yet used to calculate attribute values. In step 21, the vertices are translated, if necessary, into the coordinate space of the rendering system. At step 22, a check is made to determine whether the primitive may be trivially rejected. If so, at step 23, processing stops. If the primitive may not be trivially rejected, a check is performed at step 24 to determine whether the primitive requires clipping. If clipping is required, at step 25, the primitive is clipped and new vertices are created corresponding to the edges of the clip region. Any vertices that are clipped and thus removed from the resulting primitive are considered to be "out" of the primitive. Also at step 25, the coefficient values for the new vertices and the coordinates of the new vertices are stored for later use. At step 26, a check is made to determine whether parts of the primitive are still visible. If not visible, at step 27, processing of the primitive stops without the rendering engine calculating the attributes for the primitive. Otherwise, at step 28, the direction of the face of the primitive is determined and, at step 29, it is determined whether culling is appropriate. If culling is appropriate, at step 30, processing of the primitive terminates without the rendering engine calculating the attributes for the primitive.

If culling is not appropriate, the process continues to step 31 in which the initial vertex data (i.e., data used to calculate attributes) for the initial vertices is retrieved from computer memory. Using the retrieved sets of coefficients associated with the vertices (step 32), attribute data for the initial vertices is calculated. That is, although the rendering system may have been given basic information regarding lighting models or other attributes, it now is necessary to compute the actual attribute values for the initial vertices. Then, at step 33, attribute data is computed for the newly generated vertices in accordance with Eq. 1. More particularly, attribute values for attributes such as lighting, texturing, and fog are calculated for the new vertices based upon both the stored coefficient values for each vertex, and the recently calculated attribute values of the initial vertices.

Finally, at step 35, the set of vertices defining the newly generated primitive is rendered. This primitive may be combined with other primitives to form a graphical image. Use of the preferred embodiments thus significantly speeds-up the intermediate processing by deferring intermediate attribute calculation in lieu of the significantly less intensive coefficient calculations.

In an alternative embodiment, a preferred embodiment of the invention may be implemented as a computer program product for use with a computer system. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The above description provides details of the preferred embodiment of the present invention. Of course, it should be apparent that the present invention is not limited to the detailed description set forth above. Various changes and modifications of the invention as described will be apparent to those skilled in the art without departing from the spirit and scope of this invention as defined in the following claims.

What is claimed is:

1. A method for determining data characterizing a primitive resulting after the primitive has been subjected to clipping, the primitive initially defined by a set of initial vertices and a set of attributes associated with the initial vertices and, after each instance of clipping, the primitive being a resulting primitive defined by a modified set of vertices that may include a new vertex and a modified set of attributes associated with the modified set of vertices, the method comprising:

A. identifying the location of each new vertex that has been created by an instance of clipping and determining a set of coefficients for each new vertex, each coefficient of the set reflecting the contribution of attribute values by a vertex of the primitive prior to the instance of clipping; and excluding from the resulting primitive any vertex that is deemed out as a result of clipping;

B. repeating the preceding step A for each additional instance of clipping;

C. determining whether the primitive remains after clipping;

D. if the primitive has been determined to remain after clipping, calculating values of the attributes for each of the initial vertices; and E. calculating values of the attributes at each new vertex remaining after clipping using the set of coefficients associated therewith.

2. The method as defined by claim 1 further including the step:
   F. determining whether the resulting primitive is to be culled.

3. The method as defined by claim 2 further including the step of:
   G. if the primitive has been determined not to be culled, calculating values of the attributes for each new vertex.

4. The method as defined by claim 1 wherein the value of each coefficient associated with each new vertex is linearly related to the distance between each new vertex and the vertex of the primitive prior to the instance of clipping.

5. The method as defined by claim 4 wherein the distance is expressed as a fraction.

6. The method as defined by claim 1 wherein the attributes include color and texture.

7. A method for determining data characterizing a primitive resulting after the primitive has been subjected to clipping, the primitive initially defined by a set of initial vertices and a set of attributes associated with the initial vertices and, after each instance of clipping, the primitive being a resulting primitive defined by a modified set of vertices that may include a new vertex and a modified set of attributes associated with the modified set of vertices, the method comprising:
   A. identifying the location of each new vertex that has been created by an instance of clipping and determining a set of coefficients for each new vertex, each coefficient of the set reflecting the contribution of attribute values by a vertex of the primitive prior to the instance of clipping; and excluding from the resulting primitive any vertex that is deemed out as a result of clipping;
   B. repeating the preceding step for each additional instance of clipping;
   C. calculating values of the attributes for each of the original vertices of the primitive if the primitive remains after clipping; and
   D. calculating values of the attributes at each new vertex remaining after clipping using the set of coefficients associated therewith.

8. The method as defined by claim 7 further including the step:
   F. determining whether the resulting primitive is to be culled.

9. The method as defined by claim 8 further including the step of:
   G. if the primitive has been determined not to be culled, calculating values of the attributes for each new vertex.

10. The method as defined by claim 7 wherein the value of each coefficient associated with each new vertex is linearly related to the distance between each new vertex and the vertex of the primitive prior to the instance of clipping.

11. The method as defined by claim 10 wherein the distance is expressed as a fraction.

12. The method as defined by claim 7 wherein the attributes include color and texture.

13. A method for determining data characterizing a primitive resulting after the primitive has been subjected to clipping and culling, the primitive initially defined by a set of initial vertices and a set of attributes associated with the initial vertices and, after each instance of clipping, the primitive being a resulting primitive defined by a modified set of vertices that may include a new vertex and a modified set of attributes associated with the modified set of vertices, the method comprising:
   A. identifying the location of each new vertex that has been created by an instance of clipping and determining a set of coefficients for each new vertex, each coefficient of the set reflecting the contribution of attribute values by a vertex of the primitive prior to the instance of clipping; and excluding from the resulting primitive any vertex that is deemed out as a result of clipping;
   B. repeating the preceding step for each additional instance of clipping;
   C. calculating values of the attributes for each of the original vertices of the primitive if the primitive remains after the primitive has been clipped and culled; and
   D. calculating values of the attributes at each new vertex remaining after clipping and culling using the set of coefficients associated therewith.

14. The method as defined by claim 13 wherein the value of each coefficient associated with each new vertex is linearly related to the distance between each new vertex and the vertex of the primitive prior to the instance of clipping.

15. The method as defined by claim 14 wherein the distance is expressed as a fraction.

16. The method as defined by claim 13 wherein the attributes include color and texture.

17. An apparatus for determining data characterizing a primitive resulting after the primitive has been subjected to clipping, the primitive initially defined by a set of initial vertices and a set of attributes associated with the initial vertices and, after each instance of clipping, the primitive being a resulting primitive defined by a modified set of vertices that may include a new vertex and a modified set of attributes associated with the modified set of vertices, the apparatus comprising:
   means for identifying the location of each new vertex that has been created by an instance of clipping, means for determining a set of coefficients for each new vertex, each coefficient of the set reflecting the contribution of attribute values by a vertex of the primitive prior to the instance of clipping, and means for excluding from the resulting primitive any vertex that is deemed out as a result of clipping, the identifying means, determining means and excluding means being used for each additional instance of clipping;
   means for determining whether the primitive remains after clipping;
   means for calculating values of the attributes for each of the initial vertices if the primitive has been determined to remain after clipping; and
   means for calculating values of the attributes at each new vertex remaining after clipping using the set of coefficients associated therewith.

18. The apparatus as defined by claim 17 further including:
   means for determining whether the resulting primitive is to be culled.

19. The apparatus as defined by claim 18 further including:
   means for calculating values of the attributes for each new vertex if the primitive has been determined not to be culled.

20. The apparatus as defined by claim 17 wherein the value of each coefficient associated with each new vertex is linearly related to the distance between each new vertex and the vertex of the primitive prior to the instance of clipping.

21. The apparatus as defined by claim 20 wherein the distance is expressed as a fraction.

22. The apparatus as defined by claim 17 wherein the attributes include color and texture.

23. An apparatus for determining data characterizing a primitive resulting after the primitive has been subjected to clipping, the primitive initially defined by a set of initial vertices and a set of attributes associated with the initial vertices and, after each instance of clipping, the primitive being a resulting primitive defined by a modified set of vertices that may include a new vertex and a modified set of attributes associated with the modified set of vertices, the apparatus comprising:

means for identifying the location of each new vertex that has been created by an instance of clipping, means for determining a set of coefficients for each new vertex, each coefficient of the set reflecting the contribution of attribute values by a vertex of the primitive prior to the instance of clipping, and means for excluding from the resulting primitive any vertex that is deemed out as a result of clipping, the identifying means, determining means, and excluding means being used for each additional instance of clipping;

means for calculating values of the attributes for each of the original vertices of the primitive if the primitive remains after clipping; and means for calculating values of the attributes at each new vertex remaining after clipping using the set of coefficients associated therewith.

24. The apparatus as defined by claim 23 further including:

means for determining whether the resulting primitive is to be culled.

25. The apparatus as defined by claim 24 further including:

means for if the primitive has been determined not to be culled, calculating values of the attributes for each new vertex.

26. The apparatus as defined by claim 23 wherein the value of each coefficient associated with each new vertex is linearly related to the distance between each new vertex and the vertex of the primitive prior to the instance of clipping.

27. The apparatus as defined by claim 26 wherein the distance is expressed as a fraction.

28. The apparatus as defined by claim 23 wherein the attributes include color and texture.

29. An apparatus for determining data characterizing a primitive resulting after the primitive has been subjected to clipping and culling, the primitive initially defined by a set of initial vertices and a set of attributes associated with the initial vertices and, after each instance of clipping, the primitive being a resulting primitive defined by a modified set of vertices that may include a new vertex and a modified set of attributes associated with the modified set of vertices, the apparatus comprising:

means for identifying the location of each new vertex that has been created by an instance of clipping, means for determining a set of coefficients for each new vertex, each coefficient of the set reflecting the contribution of attribute values by a vertex of the primitive prior to the instance of clipping, and means for excluding from the resulting primitive any vertex that is deemed out as a result of clipping, the identifying means, determining means, and excluding means being used for each additional instance of clipping;

means for calculating values of the attributes for each of the original vertices of the primitive if the primitive remains after the primitive has been clipped and culled; and means for calculating values of the attributes at each new vertex remaining after clipping and culling using the set of coefficients associated therewith.

30. The apparatus as defined by claim 29 wherein the value of each coefficient associated with each new vertex is linearly related to the distance between each new vertex and the vertex of the primitive prior to the instance of clipping.

31. The apparatus as defined by claim 30 wherein the distance is expressed as a fraction.

32. The apparatus as defined by claim 29 wherein the attributes include color and texture.

33. A computer program product for use on a computer system for determining data characterizing a primitive resulting after the primitive has been subjected to clipping, the primitive initially defined by a set of initial vertices and a set of attributes associated with the initial vertices and, after each instance of clipping, the primitive being a resulting primitive defined by a modified set of vertices that may include a new vertex and a modified set of attributes associated with the modified set of vertices, the computer program product comprising a computer usable medium having computer readable program code thereon, the computer readable program code including:

program code for identifying the location of each new vertex that has been created by an instance of clipping, program code for determining a set of coefficients for each new vertex, each coefficient of the set reflecting the contribution of attribute values by a vertex of the primitive prior to the instance of clipping, and program code for excluding from the resulting primitive any vertex that is deemed out as a result of clipping, the identifying program code, determining program code and excluding program code being used for each additional instance of clipping;

program code for determining whether the primitive remains after clipping;

program code for calculating values of the attributes for each of the initial vertices if the primitive has been determined to remain after clipping; and program code for calculating values of the attributes at each new vertex remaining after clipping using the set of coefficients associated therewith.

34. The computer program product as defined by claim 33 further including:

program code for determining whether the resulting primitive is to be culled.

35. The computer program product as defined by claim 34 further including:

program code for calculating values of the attributes for each new vertex if the primitive has been determined not to be culled.

36. The computer program product as defined by claim 33 wherein the value of each coefficient associated with each new vertex is linearly related to the distance between each new vertex and the vertex of the primitive prior to the instance of clipping.

37. The computer program product as defined by claim 36 wherein the distance is expressed as a fraction.

38. The computer program product as defined by claim 33 wherein the attributes include color and texture.

39. A computer program product for use on a computer system for determining data characterizing a primitive resulting after the primitive has been subjected to clipping, the primitive initially defined by a set of initial vertices and a set of attributes associated with the initial vertices and, after each instance of clipping, the primitive being a resulting primitive defined by a modified set of vertices that may include a new vertex and a modified set of attributes associated with the modified set of vertices, the computer program product comprising a computer usable medium having computer readable program code thereon, the computer readable program code including:

program code for identifying the location of each new vertex that has been created by an instance of clipping, program code for determining a set of coefficients for each new vertex, each coefficient of the set reflecting the contribution of attribute values by a vertex of the primitive prior to the instance of clipping, and program code for excluding from the resulting primitive any vertex that is deemed out as a result of clipping, the identifying program code, determining program code and excluding program code being used for each additional instance of clipping;

program code for calculating values of the attributes for each of the original vertices of the primitive if the primitive remains after clipping; and program code for calculating values of the attributes at each new vertex remaining after clipping using the set of coefficients associated therewith.

40. The computer program product as defined by claim 39 further including:

program code for determining whether the resulting primitive is to be culled.

41. The computer program product as defined by claim 40 further including:

program code for calculating values of the attributes for each new vertex if the primitive has been determined not to be culled.

42. The computer program product as defined by claim 39 wherein the value of each coefficient associated with each new vertex is linearly related to the distance between each new vertex and the vertex of the primitive prior to the instance of clipping.

43. The computer program product as defined by claim 42 wherein the distance is expressed as a fraction.

44. The computer program product as defined by claim 39 wherein the attributes include color and texture.

45. A computer program product for use on a computer system for determining data characterizing a primitive resulting after the primitive has been subjected to clipping and culling, the primitive initially defined by a set of initial vertices and a set of attributes associated with the initial vertices and, after each instance of clipping, the primitive being a resulting primitive defined by a modified set of vertices that may include a new vertex and a modified set of attributes associated with the modified set of vertices, the computer program product comprising a computer usable medium having computer readable program code thereon, the computer readable program code including:

program code for identifying the location of each new vertex that has been created by an instance of clipping, program code for determining a set of coefficients for each new vertex, each coefficient of the set reflecting the contribution of attribute values by a vertex of the primitive prior to the instance of clipping, and program code for excluding from the resulting primitive any vertex that is deemed out as a result of clipping, the identifying program code, determining program code, and excluding program code being used for each additional instance of clipping;

program code for calculating values of the attributes for each of the original vertices of the primitive if the primitive remains after it has been clipped and culled; and program code for calculating values of the attributes at each new vertex remaining after clipping and culling using the set of coefficients associated therewith.

46. The computer program product as defined by claim 45 wherein the value of each coefficient associated with each new vertex is linearly related to the distance between each new vertex and the vertex of the primitive prior to the instance of clipping.

47. The computer program product as defined by claim 46 wherein the distance is expressed as a fraction.

48. The computer program product as defined by claim 45 wherein the attributes include color and texture.

\* \* \* \* \*